July 14, 1953 V. MARASCO 2,645,262
KNIFE ASSEMBLY FOR FRUIT SLICERS
Filed July 5, 1950
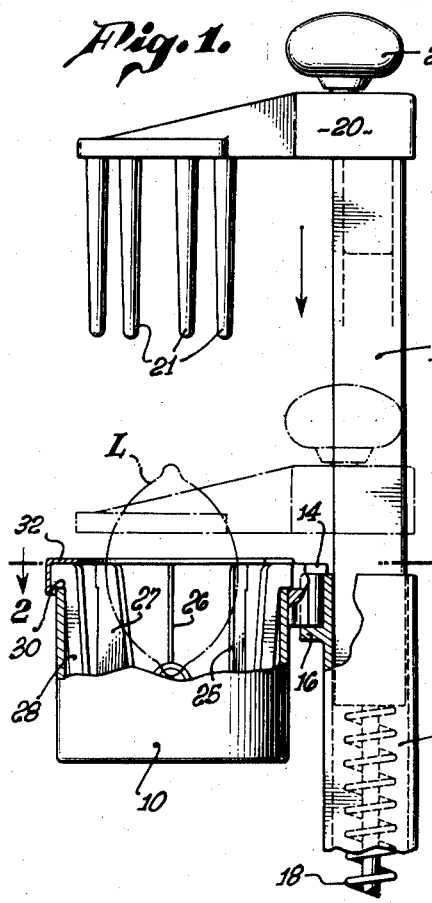
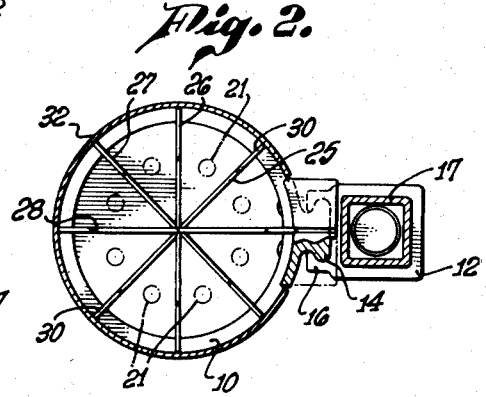
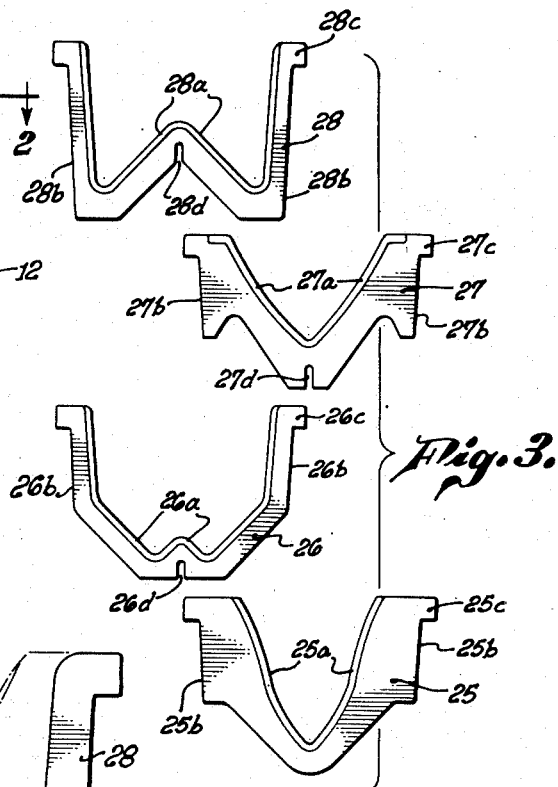
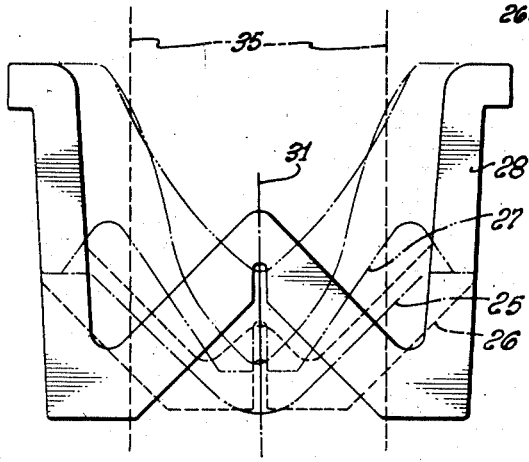
VINCENT MARASCO,
INVENTOR.
BY
ATTORNEYS.

Patented July 14, 1953

2,645,262

UNITED STATES PATENT OFFICE 2,645,262

KNIFE ASSEMBLY FOR FRUIT SLICERS

Vincent Marasco, Los Angeles, Calif.

Application July 5, 1950, Serial No. 172,109

5 Claims. (Cl. 146—3)

The present invention relates to slicing machines of the type adapted to slice fruit, particularly lemons or other citrus fruit, and more especially to an improved form of knife assembly for such slicing machine.

In hotels, restaurants, and other establishments serving food and drink, large numbers of lemons are used every day as garnishment and as seasoning for sea foods, iced tea, and the like. It is a common practice to cut the lemon longitudinally into wedge shaped sections. This manner of cutting the lemon is preferable from the standpoint of the user, but it is relatively expensive because of the time required when the segments are cut by hand. A simple type of slicing machine which can be constructed inexpensively and yet will permit rapid and satisfactory slicing of lemons with a minimum of hand labor is disclosed in my co-pending application Serial No. 693,066 filed August 26, 1946, now Patent No. 2,513,341, on "Fruit Slicer With Stationary Knives and Reciprocating Plunger."

In my co-pending application, the slicing knives are adapted to cut a lemon or other fruit into six sector-shaped sections. It has been found desirable to provide a knife assembly adapted to cut the lemon or other fruit into eight sections. In designing a knife assembly for this particular purpose, it was found that merely adding another knife or blade of the type shown in my above mentioned application resulted in an unexpected and undesirable increase in cutting resistance as the lemon was forced through the knives. As a consequence, there was a considerable deformation of the lemon and the pressure applied to the fruit in order to force it past the knives caused a substantial amount of juice to be expressed from the fruit during the slicing operation.

Hence it becomes a general object of my invention to provide a knife assembly for cutting a lemon or other fruit into a relatively large number of sections, preferably eight or more, in which the cutting edges of the blades are so arranged as to reduce the cutting resistance to a minimum and thereby avoid squeezing an appreciable amount of juice out of the fruit during the slicing operation.

It is also an object of my invention to provide an assembly of slicing knives of the character described that is simple in construction, easy to assemble and disassemble for cleaning and at the same time capable of being resharpened as necessary.

It is a further object of the invention to provide an assembly of knives for slicing a fruit of the character described with a minimum of resistance to cutting and hence force applied to the fruit throughout the cutting operation in order that the operation may be easily and quickly performed manually.

The above objects are attained in a preferred embodiment of my invention by providing a hollow, open-ended sleeve or knife-mounting frame with the knife blades extending diametrically across the frame so that the blades intersect at their mid-points with a common axis. The cutting edges of the blades face in one direction along this axis. For reasons of simplicity, it is preferred to arrange the blades facing upwardly in order that a fruit to be sliced may first rest upon them. Then the fruit is moved downwardly past the blades by suitable follower means having prongs or fingers which move into and through the spaces between successive blades. When four of these blades are provided, the cutting edges of two blades slope downwardly and inwardly toward the central axis. The cutting edges on the remaining blades slope downwardly and outwardly away from the axis, either wholly or in part. The blades are arranged to enter the fruit successively and thus distribute over the path of travel the relatively great resistance to cutting encountered as the blades initially penetrate the skin; and since some blades slope toward the axis and others away from this axis the fruit is subjected to a minimum of compressive forces tending to squeeze juice from the fruit.

How the above objects and advantages of my invention, as well as others not specifically referred to, are attained will be best understood by reference to the following description and to the annexed drawings, in which:

Fig. 1 is a fragmentary side elevation of a typical fruit slicer, with a portion of the knife holding frame broken away;

Fig. 2 is a horizontal section on line 2—2 of Fig. 1;

Fig. 3 is a side elevation of the four individual blades removed from the frame showing a preferred embodiment of my invention; and Fig. 4 is a diagram showing the profiles of the cutting blades superimposed on each other.

Referring now to Figs. 1 and 2, it will be seen that knife holding frame 10 is a hollow, open-ended member which is preferably cylindrical. It is attached to a stationary upright 12 by means of T-shaped lug 14 which fits into a similarly shaped socket in bracket 16 attached to upright 12. Lug 14 and the socket in bracket 16 are preferably slightly tapered downwardly so that the lug is held firmly in the socket when pressed downwardly but can be removed by lifting upwardly upon sleeve 10.

Upright 12 may be attached to any type of base or support (not shown) desired, either of the portable type or as a fixed installation. Reference may be had to my above mentioned co-pending application for details of construction of a slicer of the portable type. Post 12 is hollow and provided with an upper post or extension 17 which telescopes within post 12. Spring 18 within post 12 normally urges extension 17 upwardly to the position shown and is compressed as extension 17 is moved downwardly. Extension 17 carries a horizontally extending projecting head 20 on which is mounted a plurality of depending fingers 21 so arranged as to move into the spaces between the several knife blades, later to be described. A knob 22, or similar member, may be provided at the upper end of extension 17 to be gripped by the user as he manually depresses extension 17 to lower fingers 21 toward the slicing means.

This slicing means consists of a plurality of individual knife blades 25, 26, 27, and 28 illustrated in Fig. 3. Since it is desired to cut the lemon into eight sections, four blades are used; but as will be pointed out later a smaller number than four may be used and it will be obvious that likewise a larger number, if desired. The blades are made from relatively thin sheet metal with one edge sharpened to provide each blade with a pair of cutting edges 25a, 26a, 27a, and 28a, respectively. Because of the position in which the knives are normally assembled and used, as shown in Fig. 2, these cutting edges may be referred to as generally facing upwardly. Each blade has a pair of outer edges 25b, 26b, 27b, and 28b respectively which are substantially straight, or slightly tapered, for a substantial length, these edges being unsharpened. Immediately above these edges, each blade has a shoulder 25c, 26c, 27c, and 28c respectively, all of these shoulders being similar in outline. As will be seen from Fig. 2, sleeve 10 is provided at its upper edge with a plurality of pairs of diametrically spaced notches or slots 30 of a width to receive blade shoulders 25c, 26c, 27c, and 28c with a snug sliding fit. Thus the blades may be inserted in place by dropping them into these notches in the top of the sleeve.

To assemble the knives, bottom blade 25 is first dropped into sleeve 10 with its top shoulders inserted in a pair of oppositely located notches 30. Next, blade 26 is similarly inserted in a pair of notches 30, care being taken that notch 26d in the lower edge of the blade fits over and receives blade 25 at its mid-point, which is the lowest point on cutting edges 25a. The third blade is then assembled in a similar manner with its bottom notch 27d receiving blade 26 at its mid-point which is the central hump in cutting edges 26a. Finally, blade 28 is dropped in place with its bottom notch 28d fitting over the mid-point of blade 27, which is the lowest point on cutting edges 27a.

All of the blades except the lowermost one have a notch in their lower side, which is the side away from the cutting edge, in order to receive the blade below. In this way, the blades are firmly interlocked and held together at their midpoints where they intersect the axis of sleeve 10.

It will be seen from Fig. 2 that each of the pairs of cutting edges also intersect this axis which then becomes the axis of the assembly of knives. How these blades fit together and interlock with one another may be more readily understood by reference to the diagram forming Fig. 4 in which the notches in the non-cutting edges of the blades are shown with respect to the cutting edges of the blade immediately below. The value of this interlocking arrangement is that the blades are firmly held in the desired position in which they all intersect a single centrally located axis 31 (Fig. 4) without the necessity of providing means on sleeve 10 for so positioning the blades. Of course other means than the notches in the blades may be provided for this purpose if desired.

When assembled, the blades occupy equiangularly spaced positions in order that the segments of lemon are of equal size, although it will be understood that the invention is not necessarily limited to any specific spacing between the knives. In their assembled position, annular cap 32 is placed on top of sleeve 10 to improve appearance and to assist in holding the knife blades in slots 30. Since cutting pressure tends to seat the knives in frame 10, no additional locking means is required for the blades. These blades can be removed easily and quickly for cleaning or resharpening by reversing the assembly operation just described.

To operate the slicer a lemon L is placed on the knife assembly as shown in Fig. 1 with its longer dimension vertical. The operator then grasps knob 22 and pushes downwardly, bringing fingers 21 into contact with the upper end of the lemon. Continued pressure applied to knob 22 moves head 20 to the lowered position (dot-dash lines) of Fig. 1 and causes fingers 21 to push the lemon past the slicing knives. There is preferably one finger for each space between two knives in order that each of the sections formed by the slicing action is pushed entirely past the cutting edge. The sections then drop out the open lower end of frame 10. Spring 18 is preferably strong enough to return extension 17 and fingers 21 to the elevated positions shown in Fig. 1, but the operator may lift upwardly on knob 22 for this purpose.

Each of the cutting blades may be considered as having a pair of upwardly facing cutting edges, each edge starting near the outer edge of the blade and extending inwardly to the vertical axis of the assembly where the two cutting edges meet or intersect. As will be seen from Figs. 3 and 4, two of the four blades, blades 25 and 27, have cutting edges 25a and 27a respectively which are generally characterized as sloping downwardly and inwardly toward the axis of the assembly. These edges may be straight, concave, or convex, when viewed in profile as in Fig. 3 or 4, as disclosed in my co-pending application referred to above.

As best seen from Fig. 4, blades 25 and 27 preferably have upper sections of edges 25a and 27a lying at about the same radius from axis 31. This profile of the edges makes it possible for the lemon, when first placed on the knives as in Fig. 1, to engage the knives at three or four places at about the same level and so be held in the proper upright position until fingers 21 are moved into contact with the lemon. This feature contributes to producing lemon segments of the same size.

The other two blades, blades 26 and 28 have cutting edges which, for at least a portion of their length, slope downwardly and outwardly away from the axis of the assembly. As shown in Fig. 3, blade 28 may have cutting edges which extend downwardly in a generally vertical direction from a point adjacent shoulder 28c to the lowest part of the cutting edge and then up to the mid-point of the blade where the two cutting edges join. This mid-point is preferably above both the intersection of edges 25a and 27a with the central axis so that outwardly sloping edges enter the lemon early in the slicing operation. With this construction, only the central portion of each cutting edge extends downwardly and outwardly away from the central axis. However, cutting is normally or preferably confined to the central zone lying between dotted lines 35 of Fig. 4, the distance between these lines representing the diameter of the lemon or other fruit ordinarily sliced by the knives. It will be noted that the substantially vertical portion of the two cutting edges 28a lies outside of this normal cutting zone. For this reason a satisfactory knife may be made in which the vertically extending side portions of the blade have no cutting edge at all and the entire cutting edge on blade 28 may be confined to the length which slopes downwardly and outwardly from the center of the blade. Hence it is obvious that blade 28 may be modified so that the entire length of its cutting edge slopes away from the common axis of the blades.

Blade 26 may, if desired, be designed in a manner similar to the profile of blade 28. However, because of the relatively low elevation of the central or intersection point of the cutting edges 26a, a design similar to that of blade 28 would result in relatively long vertically extending sides at 26b. In order to avoid this undue downward extension of the blade, which would carry it a substantial distance below all the other blades in the assembly, the W-shaped profile shown in Fig. 3 is preferred for the central part of the cutting edges. With this configuration each cutting edge 26a slopes downwardly and away from the central axis of the assembly for a distance to the lowest point of the cutting edge, and then the slope of the edge is reversed to one which slopes upwardly and away from the axis to a point which preferably lies outside of the cutting zone as bounded by lines 35. The cutting edge may then be carried upwardly to a point opposite shoulder 26a. However, as explained above, the cutting edge may be discontinued on that portion of the blade lying outside of the central cutting zone bouned by lines 35.

It will be apparent from the foregoing that various modifications in the profiles of the cutting edges may be made. However, best results are obtained when the general principle is followed as closely as possible that where two of the four blades, blades 25 and 27, have edges which slope inwardly toward the axis of the assembly, that an equal number of blades have cutting edges which, for at least a portion of their length and preferably a majority of their length, slope reversely, that is downwardly and outwardly away from the axis. When all the blades slope toward the axis the pressure of the knives compresses the leading end of the lemon or other fruit as it passes the blades. This compression not only compacts the lemon and makes it more difficult for the knives to enter and cut the lemon but also squeezes the fruit sufficiently to express some of the juice. By arranging half the knives so that their cutting edges slope away from the central axis, half the knives exert forces on the lemon which oppose the compressive forces of the other half. The result is a much easier and freer slicing action and a balancing of forces which tend to extract juice from the lemon during the cutting operation.

With an odd number of blades it is not possible to divide the blades equally into two groups with edges sloping toward and away from the center of the blade. However, a very satisfactory slicing arrangement for cutting a lemon into six sections can be made using the three blades 25, 27, and 28. The only change required from the assembly illustrated is to omit blade 26 and to change the angular spacing between blades. Likewise, the number of blades may be increased to five or six if desired. With a number of blades in excess of four it is preferable to make the first additional blade one with the cutting edge resembling either blade 26 or 28 and the second additional blade one with a cutting edge resembling the profile of blade 25. Regardless of the number of blades used, the two cutting edges of each blade are shaped to intersect the common central axis 31 at a point spaced from the intersections of the edges of other blades. While the spaces measured along the axis, between these successive intersections are preferably substantially equal, this is not necessary although it contributes to a smoother slicing action. Likewise, all blades except the bottom one are notched on their lower edge in order to pass over and engage the blade next below.

Having described a preferred embodiment of my invention, together with certain modifications thereof, it will be evident that various changes in the configuration of the cutting edges and in the construction and arrangement of the blades may be made without departing from the spirit and scope of my invention. Consequently, I wish it understood that the foregoing description is considered to be illustrative of, rather than limitative upon, the appended claims.

I claim:
1. A knife assembly for a fruit slicer comprising: a frame; and a plurality of angularly spaced diametral knives mounted on the frame and extending continuously across a cutting zone to intersect a common axis, each of said knives having a pair of upwardly disposed cutting edges that intersect the common axis at a level different from the edges of other blades, the cutting edges of a plurality of blades sloping downwardly from substantially the same level and inwardly toward the axis and the cutting edges of an equal number of other blades, located between said inwardly sloping edges, sloping downwardly and outwardly from the axis for at least a part of their length, all said blades except one having a notch in the side away from the cutting edges to pass over and engage the blade next below.

2. A knife assembly for a fruit slicer adapted to cut a fruit into segments without cutting a core, comprising: a plurality of angularly spaced diametral knives extending continuously across a circular cutting zone and crossing a central axis at successive positions along the axis, each blade having a pair of upwardly facing cutting edges of different outline than the edges of the other blades and intersecting the axis at a position spaced from the intersection with the axis of the edges of all other blades, the edges on some of the blades sloping downwardly and inwardly toward the axis from substantially the same height at the periphery of the cutting zone and the edges on at least one other blade sloping downwardly and outwardly from the axis radially across the entire cutting zone; and each blade but one having a centrally located notch in the edge away from the cutting edges adapted slidably to engage an adjacent blade for mutual resistance to lateral displacement.

3. A knife assembly as in claim 2 in which said outwardly sloping edges are the highest of all edges at their intersection with the central axis.

4. A knife assembly as in claim 1 in which the cutting edges of the blade last to engage a fruit are W-shaped.

5. A knife assembly as in claim 1 in which each blade is individually and removably supported from the frame only by a pair of lugs at the top of the blade, slidably engaged in vertical slots opening to the top of the frame, each lug being at one side of the blade and having a downwardly facing shoulder resting on the frame.

VINCENT MARASCO.

References Cited in the file of this patent

UNITED STATES PATENTS

| Number | Name | Date |
|---|---|---|
| 573,551 | Sternberg | Dec. 22, 1896 |
| 1,399,950 | Fish | Dec. 13, 1921 |
| 1,542,554 | Jagenburg | June 16, 1925 |
| 1,910,380 | Daum | May 23, 1933 |
| 2,247,650 | Carlson | July 1, 1941 |
| 2,495,770 | Rivet | Jan. 31, 1950 |
| 2,513,341 | Marasco | July 4, 1950 |

FOREIGN PATENTS

| Number | Country | Date |
|---|---|---|
| 79,053 | Switzerland | Oct. 1, 1918 |
| 530,133 | Great Britain | Dec. 5, 1940 |